United States Patent
Jeong (10) Patent No.: US 7,827,337 B2
(45) Date of Patent: Nov. 2, 2010

(54) SHARING MEMORY INTERFACE (75) Inventor: Jong-Sik Jeong, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 211 days.

(21) Appl. No.: 11/911,017

(22) PCT Filed: Mar. 8, 2006

(86) PCT No.: PCT/KR2006/000808

§ 371 (c)(1),
(2), (4) Date: Oct. 9, 2007

(87) PCT Pub. No.: WO2006/126777

PCT Pub. Date: Nov. 30, 2006

(65) Prior Publication Data

US 2008/0183942 A1    Jul. 31, 2008

(30) Foreign Application Priority Data

May 23, 2005    (KR) ............... 10-2005-0042809

(51) Int. Cl.
*G06F 13/36* (2006.01)
(52) U.S. Cl. .................. 710/113; 710/36; 710/38; 710/305; 710/316; 711/104; 711/169
(58) Field of Classification Search ............ 710/14, 710/38, 305, 306, 316, 113, 301, 303; 711/104, 711/47, 169
See application file for complete search history.

(56) References Cited

U.S. PATENT DOCUMENTS

| | | | | |
|---|---|---|---|---|
| 5,552,994 A | * | 9/1996 | Cannon et al. ............... 700/95 |
| 5,557,757 A | * | 9/1996 | Gephardt et al. ............ 710/306 |
| 5,640,558 A | * | 6/1997 | Li ............................... 707/101 |
| 5,768,598 A | * | 6/1998 | Marisetty et al. ............ 710/260 |
| 5,793,990 A | * | 8/1998 | Jirgal et al. .................. 710/107 |
| 5,857,086 A | * | 1/1999 | Horan et al. ................. 710/306 |
| 5,860,161 A | * | 1/1999 | Hansen ........................ 711/211 |
| 5,987,533 A | * | 11/1999 | Hong ............................. 710/9 |
| 6,044,412 A | * | 3/2000 | Evoy ............................ 710/14 |

(Continued)

FOREIGN PATENT DOCUMENTS

JP    2004-070639 A    3/2004

(Continued)

OTHER PUBLICATIONS

The Institute of Electrical and Electronic Engineers, Inc. The Authoritative Dictionary of IEEE Standards Terms. "Activate". Seventh Edition. IEEE Press. 2000.*

(Continued)

*Primary Examiner*—Matthew D Spittle
(74) *Attorney, Agent, or Firm*—Birch, Stewart, Kolasch & Birch, LLP (57) ABSTRACT

A device and a method for sharing a memory interface are disclosed. According to preferred embodiments of the present invention, a supplementary control unit included in a digital processor can control some of the pins, constituting a memory interface, to be shared by a plurality of memory. With the present invention, the number of pins included in a memory interface can be minimized, thereby reducing the size of a supplementary control unit, saving the manufacturing cost, and improving the processing efficiency.

11 Claims, 5 Drawing Sheets

U.S. PATENT DOCUMENTS

| | | |
|---|---|---|
| 6,338,073 B1 * | 1/2002 | Houldsworth et al. ....... 707/206 |
| 6,347,064 B1 * | 2/2002 | Seo ....................... 365/230.01 |
| 6,820,181 B2 * | 11/2004 | Jeddeloh et al. ............. 711/169 |
| 6,821,155 B2 * | 11/2004 | Hsieh ......................... 439/630 |
| 6,835,100 B1 | 12/2004 | Chen |
| 6,886,066 B2 * | 4/2005 | Ishii .......................... 710/305 |
| 7,042,779 B2 * | 5/2006 | Dudeck et al. .............. 365/203 |
| 7,139,924 B2 * | 11/2006 | Wang ......................... 713/500 |
| 7,225,357 B2 * | 5/2007 | Tai et al. ...................... 714/25 |
| 7,493,437 B1 * | 2/2009 | Jones et al. ................. 710/301 |
| 2001/0020271 A1 * | 9/2001 | Ito ............................. 713/185 |
| 2003/0094490 A1 | 5/2003 | Lee |
| 2005/0097263 A1 * | 5/2005 | Wurzburg .................. 711/103 |
| 2005/0183986 A1 * | 8/2005 | Chen .......................... 206/713 |

FOREIGN PATENT DOCUMENTS

| | | |
|---|---|---|
| KR | 2002-41676 | 10/2001 |
| KR | 10-2005-0032692 A | 7/2004 |

OTHER PUBLICATIONS

Koivumaa, Veikko. Shared Memory Interface with the TMS320C54x DSP. Application Report. Apr. 1998.*

Altium. WB_SHARED_MEM_CTRL Configurable Shared Memory Controller. Core Reference. Oct. 18, 2007.*

Hennessy et al. Cache-Coherent Distributed Shared Memory: Perspectives on Its Development and Future Challenges. Proceedings of the IEEE, vol. 87, No. 3, Mar. 1999.*

* cited by examiner

FIG. 1

PRIOR ART

FIG. 2

PRIOR ART

| | | SD Card | Nand Flash Memory |
|---|---|---|---|
| Shared memory interface | 1 | SD DAT0 | NF Data7 |
| | 2 | SD DAT1 | NF Data6 |
| | 3 | SD DAT2 | NF Data5 |
| | 4 | SD DAT3 | NF Data4 |
| | 5 | Command | NF Data3 |
| | 6 | Card Detect | NF Data2 |
| | 7 | Power Control | NF Data1 |
| | 8 | Write Protect | NF Data0 |
| First memory interface | 9 | CLK | – |
| Second memory interface | 10 | – | CLE |
| | 11 | – | ALE |
| | 12 | – | REN |
| | 13 | – | WEN |
| | 14 | – | WP |
| | 15 | – | CS |

SHARING MEMORY INTERFACE

CROSS REFERENCE TO RELATED APPLICATIONS

This application is a U.S. National Application of International Application PCT Application No. PCT/KR2006/000808 filed on Mar. 8, 2006, which claims the benefit of priority from Korean Patent Application No. 10-2005-0042809 filed on May 23, 2005. The disclosures of International Application PCT Application No. PCT/KR2006/000808 and Korean Patent Application No. 10-2005-0042809 are incorporated herein by reference.

TECHNICAL FIELD

The present invention is related to sharing a memory interface, more specifically to a device having a memory interface sharing function and a method thereof.

BACKGROUND ART

Generally, an electric/electronic device refers to a device designed to perform a predetermined function (or functions) through a combination of electric/electronic parts. The mobile communication terminal, which is one of the most popular electric/electronic devices, is essentially a device designed to enable a mobile user to telecommunicate with a receiver who is remotely located. Thanks to scientific development, however, the latest mobile communication terminals have functions, such as camera and multimedia data playback, in addition to the basic functions, such as voice communication, short message service, and address book.

As such, the device performing multiple functions (i.e. the main function and additional functions) comprises a plurality of processors. In other words, one or more application processors, which control and perform additional functions, and a main processor, which controls the overall operation of the device and the operation of the application processor, can be comprised. For example, for a mobile communication terminal that processes an image signal, the main processor controls the communication function as well as the overall operation of the mobile communication terminal, and the application processor controls the processing of the image signal, under the control of the main processor.

Other than the mobile communication terminal described above, there can be a variety of portable terminals, such as personal digital assistants (PDA) and portable multimedia players (PMP), which comprise a plurality of processors to perform multiple functions. Here, portable terminals refer to electronic devices that can be easily carried by making the size compact in order to perform functions such as game and mobile communication.

Having an electric/electronic device perform multiple functions requires one or more storage devices for storing data and information required for the functions. Common storage devices include NAND flash memories and SD (Secure Digital) cards. The NAND flash memory is directly coupled to the phone board of a mobile communication terminal, and thus it is not possible to be removed by the user. On the other hand, the SD card can be removed by the user since the socket is mounted on the phone board.

Figure 1:
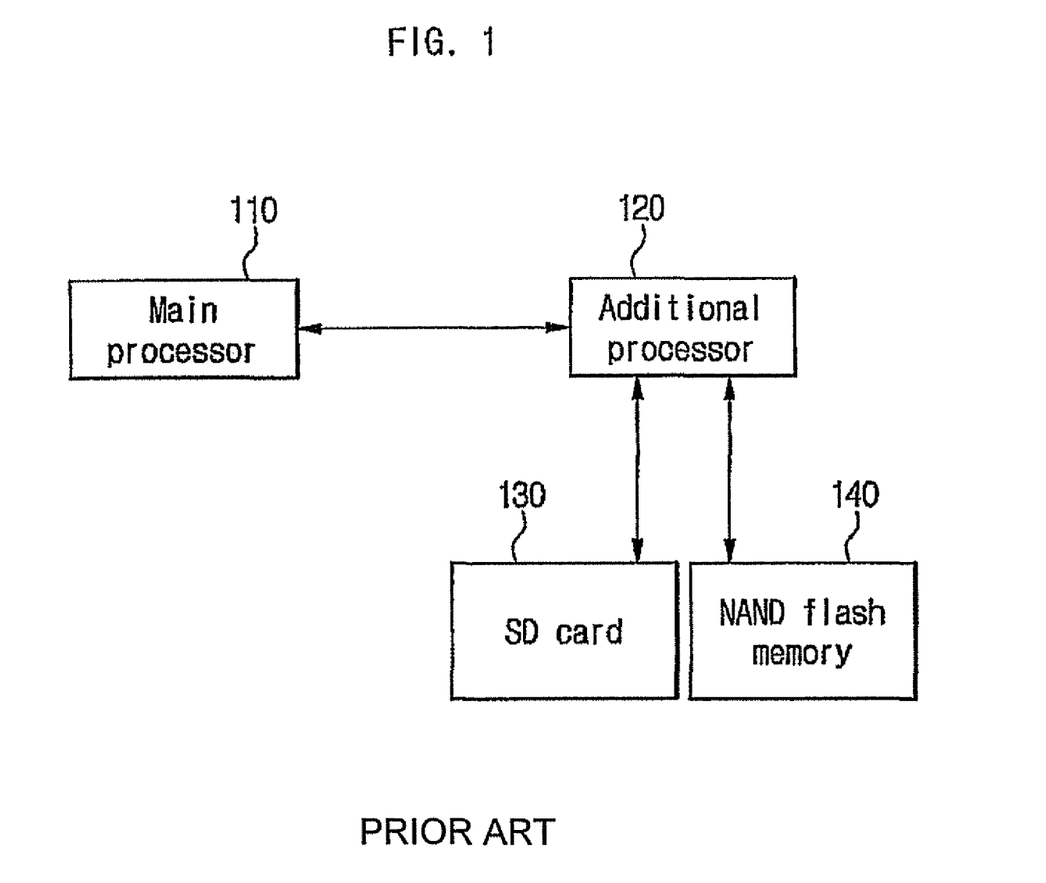
FIG. 1 shows a block diagram of a device using a plurality of memories in accordance with the prior art.
Figure 2:
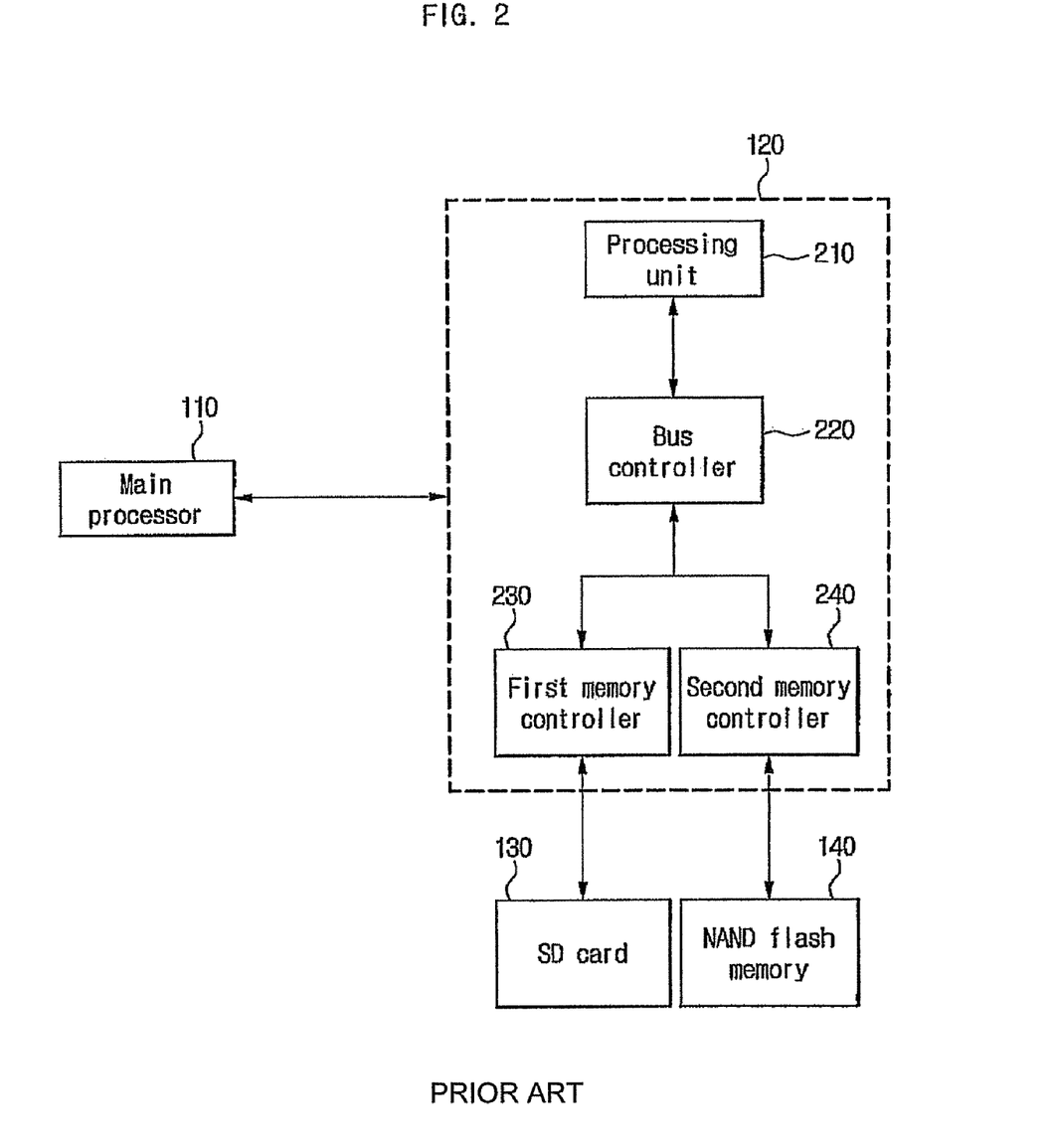
FIG. 2 shows a block diagram outlining an application processor in accordance with the prior art.

An internal system of a device having a plurality of processors and a plurality of memories is illustrated in FIG. 1 and FIG. 2.

FIG. 1 is a diagram showing a device, in which a plurality of memories are used, and FIG. 2 is a block diagram outlining an application processor in accordance with the prior art.

As shown in FIG. 1, in the device for performing multiple functions, a main processor 110 and an application processor 120 are coupled through a bus, which is for communicating data and/or information, and the application processor 120 is coupled to one or more memories. A bus refers to a common-purpose electrical route, used for the communication of information between processors or between a processor and a memory.

The application processor 120 can be coupled to an SD card 130 and a NAND flash memory 140, and interfaces for coupling the memories 130 and 140. In other words, the application processor 120 operates the plurality of memory interfaces as necessary to store multimedia data in any of the memories or to read and playback the stored data.

Referring to FIG. 2, the application processor 120 comprises a processing unit 210, a bus controller 220, a first memory controller 230, and a second memory controller.

The processing unit 210 performs predetermined functions (e.g. MPEG4, 3-D graphics, and camera), designed to be performed by the application processor 120. The processing unit 210 also controls the bus controller 220 by interpreting instructions (including information on which interface to use) received from the main processor 110 and delivering the instruction to the bus controller. The processing unit 210 can be, for example, a 32-bit processor.

The bus controller 220 performs internal bus control such that the first memory controller 230 or the second memory controller 240 is operated by the control of the processing unit 210.

The first memory controller 230 performs data and/or information communication with the SD card 130 through the first memory interface. Usually, a 9-pin interface is used for the first memory interface, which is in the application processor, for coupling to the SD card 130. The 9-pin interface is structured with 4 data signal pins (i.e. SD DAT0, SD DAT1, SD DAT2, and SD DAT3) and 5 control signal pins (i.e. CLK signal, Command signal, Card Detect signal, Power Control signal, and Write Protect signal).

The second memory controller 240 performs data and/or information communication with the NAND flash memory 140 through the second memory interface. Usually, a 14-pin interface is used for the second memory interface, which is in the application processor, for coupling to the NAND flash memory 140. The 14-pin interface is structured with 8 data signal pins (i.e. NF Data0, NF Data1, NF Data2, NF Data3, NF Data4, NF Data5, NF Data6, and NF Data7) and 6 control signal pins (i.e. CS (Chip Select) signal, CLE (Command Latch Enable) signal, ALE (Address Latch Enable) signal, REN (Read Enable) signal, WEN (Write Enable) signal, and WP (Write Protection) signal).

Since the conventional device has to have all memory interfaces that can be coupled, a total of 23 pins (9 pins for the SD card 130 and 14 pins for the NAND flash memory 140) are needed in the case illustrated by FIGS. 1 and 2.

In most devices, however, the application processor 120 does not access a plurality of memories simultaneously. Rather, the application processor 120 alternately accesses one memory at a time. Although the main processor 110 attempts to access the SD card 130 or the NAND flash memory 140, the main processor 110 never accesses the two memories at the same time. Considering this, the application processor 120 does not need to have 2 memory interfaces, and having 2 memory interfaces would be a waste of resource.

Moreover, have 2 memory interfaces causes an increase in physical size, and consequently a cause for increased price.

DISCLOSURE

Technical Problem

In order to solve the above problems, the present invention aims to provide a device and a method of sharing a memory interface that can provide the simplest structure of memory interface, coupling to a plurality of memories.

Another object of the present invention is to provide a device and a method of sharing a memory interface that can increase the efficiency of an application processor and reduce the current for operating the application processor, by minimizing the number of pins included in the memory interface.

It is yet another object of the present invention to provide a device and a method of sharing a memory interface that can lower the price of an application processor by simplifying the structure of the memory interface that can be coupled to a plurality of memories.

It is still another object of the present invention to provide a device and a method of sharing a memory interface in which more efficient operation is possible by solving the problem of having to dispose a pin even for a function that is not always used and by opening the path of an interface to be used and running only an appropriate logic through sharing the memory interface.

Technical Solution

In order to achieve the above objects, an aspect of the present invention features an application processor that can be coupled to a plurality of memories and/or a digital processing apparatus comprising the application processor.

According to a preferred embodiment of the present invention, the application processor in a digital processing apparatus, comprising a main processor, an application processor performing a predetermined additional function in accordance with the control of the main processor, and a plurality of memories being coupled to the application processor, comprises: a processing unit, performing the additional function; a route controller, setting a path for data communication with one of the memories consisting of a first memory and a second memory coupled to the application processor, the path being set through a shared memory interface in accordance with the control of the processing unit; a first memory controller, communicating information with the first memory through a first memory interface and the route controller; and a second memory controller, communicating information with the second memory through a second memory interface and the route controller.

The application processor can further comprise a bus controller, performing bus control in accordance with the control of the processing unit. The route controller can set the path for data communication in accordance with a route control signal received from the bus controller.

In case the number of pins for interfacing with the first memory is n (a natural number) and the number of pins for interfacing with the second memory is m (a natural number larger than n), the shared memory interface can comprise k (a natural number) pins between 1 and n-1, the first memory interface can comprise n-k pins, and the second memory interface can comprise m-k pins.

The first memory interface and the second memory interface can comprise at least one pin for transmitting at least one of the signals consisting of a clock (CS) signal and a chip select (CS) signal.

The first memory can be one of the memories consisting of an internal memory and a removable memory, and the second memory can be the other of the memories consisting of an internal memory and a removable memory. The removable memory can be one of the cards consisting of an SD (Secure Digital) card, a CF (Compact Flash) memory card, an XD (extreme Digital Picture Card), an MS (Memory Stick), and an MMC (Multi-Media Card).

The digital processing apparatus in accordance with another preferred embodiment of the present invention can comprise: a main processor; an application processor, performing a predetermined additional function in accordance with the control of the main processor; and a plurality of memories, being coupled to the application processor. The application processor can comprise: a processing unit, performing the additional function; a route controller, setting a path for data communication with one of the memories consisting of a first memory and a second memory coupled to the application processor, the path being set through a shared memory interface in accordance with the control of the processing unit; a first memory controller, communicating information with the first memory through a first memory interface and the route controller; and a second memory controller, communicating information with the second memory through a second memory interface and the route controller.

In order to achieve the above objects, another aspect of the present invention features a method of sharing a memory interface, performed in a digital processing apparatus comprising an application processor, and/or a recorded medium recording a program for performing the method.

According to a preferred embodiment of the present invention, the method of sharing a memory interface, performed by an application processor in a digital processing apparatus, comprising a main processor, an application processor performing a predetermined additional function in accordance with the control of the main processor, and a plurality of memories being coupled to the application processor, comprises: receiving from the main processor a request for accessing a memory; setting a path for accessing a memory corresponding to the request; and delivering data received from the main processor to a corresponding memory through the set path. The path is set through an individual memory interface, independently connected to a memory corresponding to the request, and a shared memory interface, shared by a plurality of memories.

In case the number of pins for interfacing with a first memory coupled to the application processor is n (a natural number) and the number of pins for interfacing with a second memory coupled to the application processor is m (a natural number larger than n), the shared memory interface can comprise k (a natural number) pins between 1 and n-1, the first memory interface can comprise n-k pins, and the second memory interface can comprise m-k pins.

The individual memory interface can comprise at least one pin for transmitting at least one of the signals consisting of a clock (CS) signal and a chip select (CS) signal.

The first memory can be one of the memories consisting of an internal memory and a removable memory, and the second memory can be the other of the memories consisting of an internal memory and a removable memory.

According to another preferred embodiment of the present invention, a recorded medium tangibly embodies a program, readable by a digital processing apparatus, of instructions executable by the digital processing apparatus to execute a method of sharing a memory interface. The program executes the steps of: an application processor receiving from a main processor a request for accessing a memory; setting a path for accessing a memory corresponding to the request, wherein the path is set through an individual memory interface and a shared memory interface, the individual memory interface being independently connected to a memory corresponding to the request, the shared memory interface being shared by a plurality of memories; and delivering data received from the main processor to a corresponding memory through the set path. The digital processing apparatus comprises the main processor, the application processor performing a predetermined additional function in accordance with the control of the main processor, and a plurality of memories being coupled to the application processor.

DESCRIPTION OF KEY ELEMENTS

120: Application processor
210: Processing unit
220: Bus controller
230: First memory controller
240: Second memory controller

MODE FOR INVENTION

The present invention, operative advantages of the present invention, and objects achieved by embodying the present invention shall be apparent with reference to the accompanying drawings and the description therein.

Hereinafter, preferred embodiments of the present invention shall be described in detail with reference to the accompanying drawings. To aid overall understanding of the present invention, the same reference numbers shall be assigned to the same means, regardless of the figure number. Moreover, the numbers (e.g., first, second, A, B, etc.) are only used in the description to identify identical or similar elements.

Moreover, it is evident that the present invention can be applied to any digital processing apparatus (e.g. a mobile communication terminal having a camera function), which can perform multiple functions, equivalently or similarly without any restriction.

Furthermore, memories that can be installed in or coupled to a device having a memory interface sharing function in accordance with the present invention include internal memories and removable memories. An internal memory refers to a memory, such as a NAND flash memory, installed in a device such that that it is not easily detachable by the user. A removable memory refers to a memory that is easily detachable through a socket disposed on a device. Examples of a removable memory include SD card, CF (compact flash) memory card, XD (extreme digital) Picture Card, MS (memory stick), and MMC (Multi-Media Card).

However, in order to ease the description and understanding, the following description will assume that two memories are coupled to the application processor, the coupled internal memory is a NAND flash memory, and the coupled removable memory is an SD card.

Figure 3:
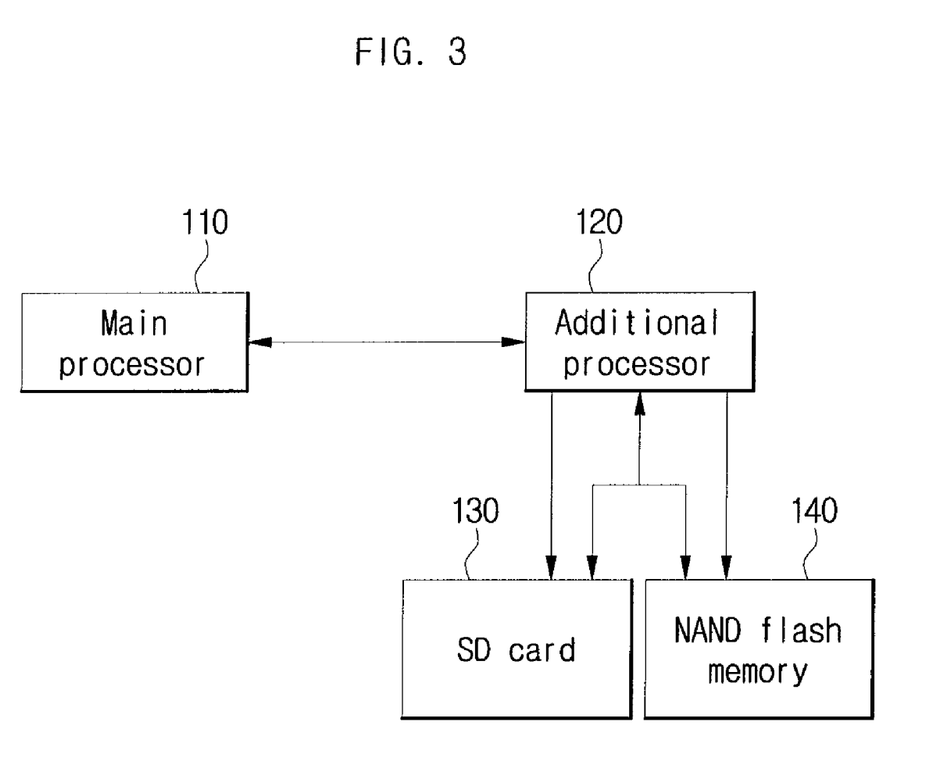
FIG. 3 shows a block diagram outlining a device coupled to a plurality of memories in accordance with a preferred embodiment of the present invention.
Figure 4:
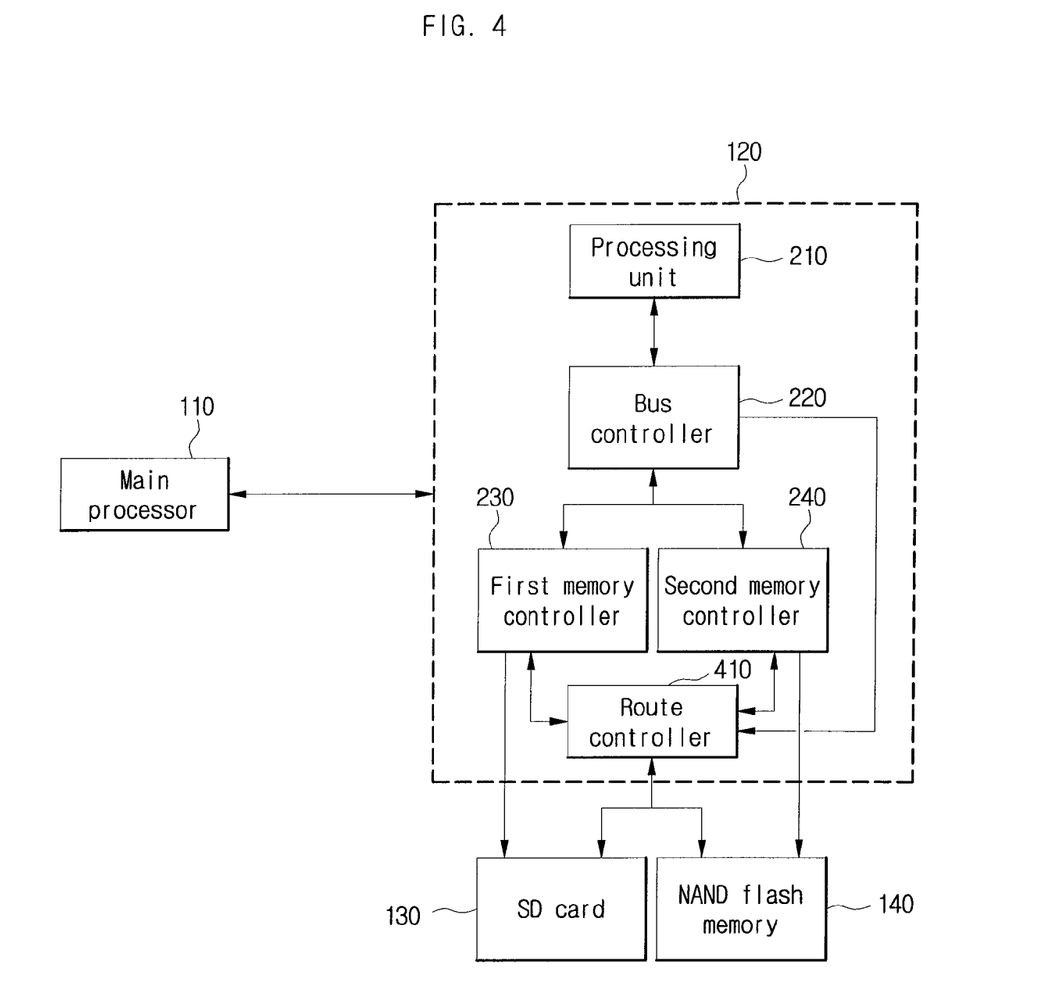
FIG. 4 shows a block diagram outlining an application processor in accordance with a preferred embodiment of the present invention.
Figure 5:
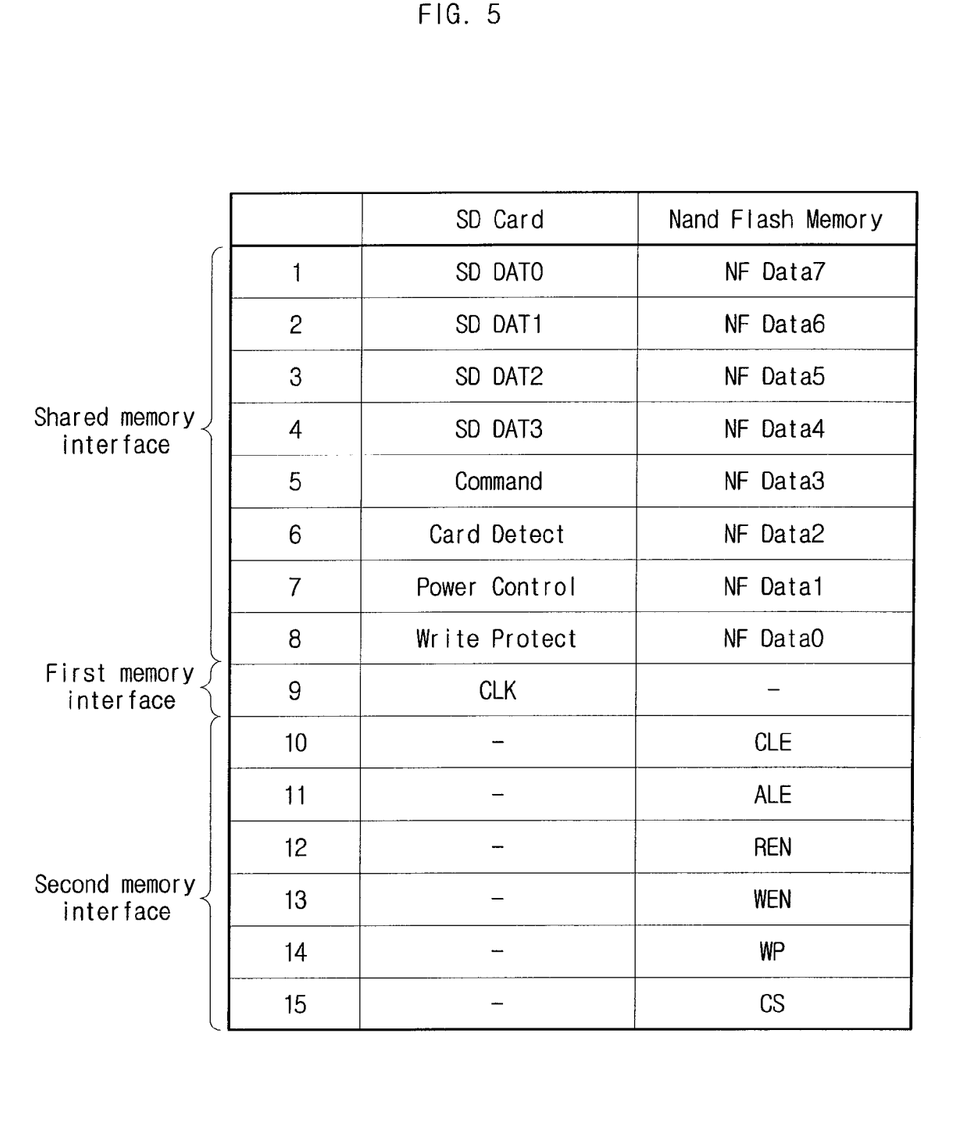
FIG. 5 illustrates the function of pins (pin muxing table) in a memory interface in accordance with a preferred embodiment of the present invention.

FIG. 3 is a block diagram outlining the structure of a device, to which a plurality of memories are coupled, in accordance with a preferred embodiment of the present invention; FIG. 4 is a block diagram outlining the application processor in accordance with a preferred embodiment of the present invention; and FIG. 5 is an illustration of the function of pins (pin muxing table) in a memory interface in accordance with a preferred embodiment of the present invention.

Referring to FIG. 3, in the device for performing multiple functions, in accordance with the present invention, the main processor 110 and the application processor 120 are coupled through a bus for communicating data and/or information, and the application processor 120 is coupled to one or more memories. A bus refers to a common-purpose electrical route, used for communicating information between processors or between a processor and a memory.

The application processor 120 can be coupled to the SD card 130 and the NAND flash memory 140, as illustrated, and has memory interfaces for coupling to the memories 130 and 140. In other words, the application processor 120 operates the plurality of memory interfaces as necessary to store multimedia data in any of the memories or to read and playback the stored data. The memory interface in the application processor 120 consists of a first memory interface, for communicating signals independently with a removable memory (e.g. SD card 130), a second memory interface, for communicating signals independently with an internal memory (e.g. NAND flash memory 140), and a shared memory interface, selectively being shared for communicating signals with the removable memory or the internal memory.

Referring to FIG. 4, the application processor in accordance with the present invention comprises the processing unit 210, a bus controller 220, the first memory controller 230, the second memory controller 240, and a route controller 410. The processing unit 210 performs predetermined functions (e.g. MPEG4, 3-D graphics, and camera), designed to be performed by the application processor 120. The processing unit 210 also controls the bus controller 220 by interpreting instructions (including information on which interface to use) received from the main processor 110 and delivering the instruction to the bus controller. The processing unit 210 can generate a route control signal, for allowing the bus controller 220 to set a route to a memory, and send the route control signal to the bus controller. The processing unit 210 can be, for example, a 32-bit processor.

The bus controller 220 performs internal bus control such that the first memory controller 230 or the second memory controller 240 is operated by the control of the processing unit 210. The bus controller 220 also controls the route controller 410 such that the shared memory interface is coupled to a requested memory by the control of the processing unit 210. Once the route control signal is received from the processing unit 210, the bus controller 220 activates the first memory controller 230 or the second memory controller 240 in accordance with the route control signal and sends the route control signal to the route controller 410 such that communication of information with a corresponding memory becomes possible through the shared memory interface. The route control signal can be generated by the bus controller 220 using the information (i.e. interpretation of the instruction received from the main processor 110) delivered from the processing unit 210. The first memory controller 230 and the second memory controller 240 can be already activated by default.

The first memory controller 230 sends a control signal to the SD card 130 through the first memory interface. The signal delivered to the SD card 130 through the first memory interface can be restricted to a signal that is not muxed with other signals, that is, a signal requiring an independent pin. For example, among the signals (i.e. the data signal, clock (CLK) signal, Command signal, Card Detect signal, Power Control signal, and Write Protect signal) delivered to the SD card 130, the only signal that is not muxed with other signals is the CLK signal, and thus only the CLK signal can be set to be transmitted through the first memory interface. Therefore, the first memory interface can have at least one pin for the transmission of the CLK signal. In another example of the external memory being a CF memory card, the first memory interface can have at least two pins for the unmuxed signals of the chip select (CS) signal and CLK signal. In another example of the external memory being an XD card or MMC, the first memory interface can have at least one pin for the unmuxed, CLK signal.

The second memory controller 240 sends a control signal to the NAND flash memory 140 through the second memory interface. The signal delivered to the NAND flash memory 140 through the second memory interface can also be restricted to a signal that is not muxed with other signals. For example, among the signals (i.e. the data signal, CS signal, CLE signal, ALE signal, REN signal, WEN signal, and WP signal), the only signal that is unmuxed (can not share the pin) is the CS signal. However, since the SD card 130 requires only 9 pins, which are less than 14 pins in the NAND flash memory 140, for interfacing, there are unmuxed signals. For example, the additional, unmuxed signals can be the CLE signal, ALE signal, REN signal, WEN signal, and WP signal. The above unmuxed signals can be set to be transmitted to the NAND flash memory through the second memory interface. Therefore, the second memory interface can have 6 pins for sending the above signals. Of course, in case other memories require more number of pins, there can be as few as one pin (i.e. the pin for CS signal) in the second memory interface.

The route controller 410 controls the data flow, depending on which memory is used by the control of the bus controller 220. The route controller 410 enables the communication of information between the first memory controller 230 or second memory controller 240 and the SD card 130 or NAND flash memory 140 by controlling the shared memory interface. For example, the route controller 410 can select only one of the signals provided by the first memory controller 230 or second memory controller 240, in accordance with the route control signal received from the bus controller 220, and output the selected signal through the shared memory interface. The shared memory interface comprises pins for the signals, which can be muxed, among the signals being communicated with the memories 130 and 140.

As described above, the application processor in accordance with the present invention can communicate most signals, except a few signals, through the shared memory interface although it is coupled to a plurality of memories. The shared memory interface, which means that the pin is shared, means that the pins shared in the circuit are commonly connected to the memories 130 and 140. The functions of the pins of the memory interface in accordance with the present invention are illustrated (in the pin muxing table) in FIG. 5. As illustrated in FIG. 5, the number of pins to be comprised in the application processor 120 can be reduced to 15 by implementing the shared memory interface. As described earlier, in the prior art, which has an independent interface for each memory, a total of 23 pins are needed.

The process of the main processor 110 writing or reading data by accessing the SD card 130 is briefly described below with reference to FIG. 4. Since the process of the main processor 110 writing or reading data by accessing the NAND flash memory 140 is similar, its description will not be provided here.

In order to write data in the SD card 130, the main processor 110 sends a command and the data to the application processor 120. The application processor 120 activates the first memory controller 230 by referencing the interface selection information included in the command, and sets the route by controlling the route controller 410 such that the data communication with the SD card 130 becomes possible. Then, the application processor 120 stores the data, received or being received from the main processor 110, in the SD card 130 through the set route.

The main processor 110 also reads data from the SD card 130 through the set route.

The drawings and detailed description are only an example of the present invention, serve only for describing the present invention, and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

As used in this application, the term "unit" is intended to refer to, but is not limited to, a software or hardware component, which performs certain tasks. A unit or component may advantageously be configured to reside on the addressable storage medium and configured to execute on one or more processors. Thus, a unit or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

As described above, the device and method of sharing a memory interface can provide the simplest structure of memory interface for coupling to a plurality of memories.

The present invention can also increase the efficiency of the application processor and reduce the current for operating the application processor, by minimizing the number of pins included in the memory interface.

Moreover, the present invention can lower the price of the application processor by simplifying the structure of the memory interface that can be coupled to a plurality of memories.

Furthermore, the present invention makes more efficient operation possible by solving the problem of having to dispose a pin even for a function that is not always used and by opening the path of an interface to be used and running only an appropriate logic through sharing the memory interface.

What is claimed is:

1. An application processor in a digital processing apparatus, said digital processing apparatus comprising a main processor, said application processor, a first memory and a second memory, said application processor performing a predetermined function in accordance with a control of said main processor, said first memory and said second memory being coupled to said application processor, said application processor comprising:
a processing unit operatively coupled to said main processor, said first memory, and said second memory, said processing unit performing said predetermined function, and generating a route control signal to set a path to said first memory or said second memory;
a route controller coupled to said first memory and second memory, said route controller setting said path for data communication with one of said first memory and second memory, said path being set through a shared memory interface for said first memory and said second memory in accordance with a control of said processing unit;
a first memory controller, said first memory controller communicating information with said first memory through a first memory interface and said route controller;
a second memory controller, said second memory controller communicating information with said second memory through a second memory interface and said route controller; and
a bus controller, said bus controller performing bus control in accordance with said control of said processing unit, and activating said first memory controller or said second memory controller in accordance with said path set to said first memory or said second memory according to said route control signal,
wherein said first memory is a removable memory and said second memory is an internal memory, and said first memory interface includes at least one pin for transmitting a clock (CLK) signal and said second memory interface includes at least one pin for transmitting a chip select (CS) signal, and
when the number of pins for interfacing with said first memory is n (a natural number) and the number of pins for interfacing with said second memory is m (a natural number larger than n), said shared memory interface comprises k (a natural number) pins between 1 and n-1, said first memory interface comprises n-k pins, and said second memory interface comprises m-k pins.

2. The application processor of claim 1, wherein said route controller sets said path for data communication in accordance with said route control signal received from said bus controller.

3. The application processor of claim 1, wherein said removable memory is one of the cards consisting of an SD (Secure Digital) card, a CF (Compact Flash) memory card, an XD (extreme Digital Picture Card), an MS (Memory Stick), and an MMC (Multi-Media Card).

4. The application processor of claim 1, wherein said first memory interface additionally delivers a chip select (CS), and said second memory interface additionally delivers one or more of a data signal, a CLE signal, a ALE signal, a REN signal, a WEN signal and a WP signal.

5. A digital processing apparatus, comprising:
a plurality of memories including a first memory and a second memory;
a main processor; and
an application processor operatively coupled to said main processor, said first memory, and said second memory, and performing a predetermined function in accordance with a control of said main processor,
wherein said application processor comprises:
a processing unit operatively coupled to said main processor, said first memory, and said second memory, said processing unit performing said predetermined function, and generating a route control signal to set a path to said first memory or said second memory;
a route controller coupled to said first memory and second memory, said route controller setting said path for data communication with one of said first memory and second memory, said path being set through a shared memory interface in accordance with a control of said processing unit;
a first memory controller, said first memory controller communicating information with said first memory through a first memory interface and said route controller;
a second memory controller, said second memory controller communicating information with said second memory through a second memory interface and said route controller; and
a bus controller, said bus controller performing bus control in accordance with said control of said processing unit, and activating said first memory controller or said second memory controller in accordance with said path set to said first memory or said second memory according to said route control signal,
wherein said first memory is a removable memory and said second memory is an internal memory, and said first memory interface includes at least one pin for transmitting a clock (CLK) signal and said second memory interface includes at least one pin for transmitting a chip select (CS) signal, and
when the number of pins for interfacing with said first memory is n (a natural number) and the number of pins for interfacing with said second memory is m (a natural number larger than n), said shared memory interface comprises k (a natural number) pins between 1 and n-1, said first memory interface comprises n-k pins, and said second memory interface comprises m-k pins.

6. The digital processing apparatus of claim 5, wherein said route controller sets said path for data communication in accordance with a route control signal received from said bus controller.

7. The digital processing apparatus of claim 5, wherein said removable memory is one of the cards consisting of an SD (Secure Digital) card, a CF (Compact Flash) memory card, an XD (extreme Digital Picture Card), an MS (Memory Stick), and an MMC (Multi-Media Card).

8. The digital processing apparatus of claim 5, wherein said first memory interface additionally delivers a chip select (CS) signal, and said second memory interface additionally delivers one or more of a data signal, a CLE signal, a ALE signal, a REN signal, a WEN signal and a WP signal.

9. A method of sharing a memory interface, performed by an application processor in a digital processing apparatus, said digital processing apparatus comprising a main processor, the application processor, and a plurality of memories including a first memory and a second memory, said application processor performing a predetermined additional function in accordance with a control of said main processor, said first memory and said second memory being coupled to said application processor, said method comprising:
  receiving from said main processor a request for accessing said first memory or said second memory;
  generating a route control signal to set a path to said first memory or said second memory corresponding to said request;
  setting said path for accessing said first memory or said second memory corresponding to said route control signal;
  performing bus control and activating a first memory controller or a second memory controller in accordance with said path set to said first memory or said second memory according to said route control signal; and
  delivering data received from said main processor to said corresponding first memory or said second memory through said set path,
  wherein said path is set through a first memory interface or a second memory interface, and a shared memory interface, said first memory interface and said second memory interface being independently connected to said corresponding first memory and said second memory according to said request, and said shared memory interface being shared by said first memory and said second memory, and
  wherein said first memory is a removable memory and said second memory is an internal memory, and said first memory interface includes at least one pin for transmitting a clock (CLK) signal and said second memory interface includes at least one pin for transmitting a chip select (CS) signal, and
  when the number of pins for interfacing with said first memory coupled to said application processor is n (a natural number) and the number of pins for interfacing with said second memory coupled to said application processor is m (a natural number larger than n), said shared memory interface comprises k (a natural number) pins between 1 and n-1, said first memory interface comprises n-k pins, and said second memory interface comprises m-k pins.

10. A non-transitory recorded medium tangibly embodying a program of instructions executable by a digital processing apparatus to execute the method recited in claim 9.

11. The method of sharing a memory interface of claim 9, wherein said first memory interface additionally delivers a chip select (CS) signal, and said second memory interface additionally delivers one or more of a data signal, a CLE signal, a ALE signal, a REN signal, a WEN signal and a WP signal.

* * * * *